Patented Sept. 21, 1943

2,330,181

UNITED STATES PATENT OFFICE 2,330,181

DEHYDRATING CASTOR OIL

Alexander Schwarcman, Buffalo, N. Y., assignor to Spencer Kellogg and Sons, Inc., Buffalo, N. Y., a corporation of New York No Drawing. Application October 23, 1941, Serial No. 416,284

10 Claims. (Cl. 260—405.5)

This invention relates to dehydrating castor oil; and it comprises a method of dehydrating castor oil to render it miscible with mineral oils, or to impart drying properties to it, wherein a catalytic proportion of a neutral alkyl sulfate, advantageously diethyl sulfate, is dissolved in the oil and the oil is heated, usually under subatmospheric pressure, for such temperature and time as to effect at least partial dehydration of the oil; the heating conditions often being so controlled as to polymerize the oil in addition to dehydrating it; all as more fully hereinafter set forth and as claimed.

Castor oil is largely composed of ricinolein, the triglyceride of ricinoleic acid. Ricinoleic acid has one double bond in the carbon chain, and is further characterized by carrying an alcoholic hydroxyl (—OH) group. By virtue of its alcoholic nature, castor oil is soluble in alcohol, but it is not soluble in most hydrocarbon solvents, including petroleum oils. Normal castor oil is a lubricant, but it is not miscible with petroleum lubricating oils. Nor is normal castor oil a drying oil. It does not "dry" to form films, in the manner of linseed oil and other true drying oils.

By heating castor oil under suitable conditions of temperature and pressure the oil is progressively changed in properties. For example, castor oil becomes miscible with some mineral oils after relatively little heating. Continued heating under suitable conditions converts the oil into a product having film-forming or drying properties. Such treatments make the castor oil useful in many compositions for which the raw oil is quite unsuited.

These changes are due to reactions taking place in the oil; usually dehydration with removal of hydroxyl groups or dehydroxylation; elimination of some or all of the alcoholic hydroxyl groups from the ricinoleic acid chains. In general an adjacent hydrogen atom is removed with each hydroxyl group, and forms H2O, which is evolved as steam. An additional double bond is thus established in each ricinoleic acid group. The drying properties of the processed oil depend on how many of these additional double bonds are developed in the castor oil. The well-known acetyl-group test is a measure of the extent to which hydroxyl groups have been removed from, and double bonds developed in, castor oil. Raw castor oil has an "acetyl value" of about 125 to 150. A "perfect" drying oil would have a zero acetyl value.

In practice, reactions other than the desired dehydration take place during the heat treatment of castor oil, especially when no catalysts are employed. These side reactions involve esterification, darkening, development of acidity and pyrolysis (destructive distillation) to a greater or less extent, and are generally undesirable. They make it difficult to obtain a light colored commercial oil, free of acidity and other undesirable properties, by thermal treaments. The difficulties are especially pronounced when it is desired to produce a substantially completely dehydroxylated oil having useful drying properties.

There have been many suggestions to incorporate various substances in castor oil before or during heating, with the object of accelerating the dehydration reaction, and minimizing other and undesired reactions. The compounds proposed for this purpose vary considerably in effectiveness, and in type. A number of the catalysts proposed, and used to some extent, have been acids or acidic substances. This tendency of the art is probably due to the knowledge or belief that in the dehydration of castor oil by simple heat treatment, free ricinoleic acid is formed, and that this acid catalyzes the dehydration. Accordingly, the art has generally tried to substitute some other acid for the ricinoleic acid.

Unfortunately, most of the acidic substances proposed have more or less accelerating effect on the side reactions as well as on dehydration. A further disadvantage is that many such catalysts, especially most of the inorganic acids and acid compounds, are not soluble in castor oil and special steps have to be taken to keep them distributed through the oil during treatment; yet they are not readily removable from the final product.

The present invention departs from the usual teaching in the art. I have discovered a class of neutral organic catalysts, quite as effective as are acidic catalysts in accelerating dehydration of castor oil, but relatively free from undesirable tendencies to promote side reactions, and indeed presenting advantages not obtainable with any hitherto known catalysts, so far as I am aware. The catalysts employed in my invention are neutral akyl sulfates, best typified by diethyl sulfate.

Diethyl sulfate, $(C_2H_5)_2SO_4$, is a neutral derivative of sulfuric acid $(H_2SO_4)$ in which the two hydrogens are replaced by ethyl groups. It is neutral and relatively stable. It does not discolor the oil by charring; as a matter of fact the final product is nearly or quite as light in color as the initial oil. It does not decompose the glyceride and hence a product of very low acid value is obtained. It cannot introduce a sulfonic group in the castor oil, and for that reason the product has exceptional waterproof qualities. Such qualities are impaired by the presence of sulfonic groups.

Another important practical advantage of diethyl sulfate is that it is freely soluble in castor oil—a property which eliminates any need for the stirring or agitation required with insoluble catalysts. The catalyst, which is a liquid, can be distributed with perfect uniformity throughout the body of oil treated, by a simple preliminary stirring or mixing. The mechanical difficulties incident to agitating a charge of liquid which is maintained under sub-atmospheric pressure at elevated temperatures are completely avoided.

In employing diethyl sulfate, it is unnecessary to bring the oil up to reaction temperature before incorporating the catalyst. It can be incorporated in the cold oil and heated up with it, without resulting in decomposition. A further advantage is that, because the catalyst is neutral and non-charring, the oil and catalyst mixture can be heated directly to the polymerizing temperature, thus making it possible to dehydrate the oil and polymerize it in the same operation, and in a minimum time.

In the usual mode of operating the process of the present invention, the diethyl sulfate is incorporated in castor oil, in amounts about 0.05 to 1 per cent, and the oil is brought up to a temperature of 500° to 540° F. The action of the catalyst when this temperature range is reached is rapid and even violent. At about 500° a rapid evolution of water vapor is observed, and after a short time dehydration is substantially complete, as indicated by the acetyl test (a measure of the number of hydroxyl groups present). When so operating that the temperature continues to rise during this part of the treatment, the dehydration reaction appears to be complete within 5 or 10 minutes after a temperature of 540° is reached.

If it is desired to polymerize the oil, as well as to dehydrate it, in order to develop maximum properties and water resistance, the oil containing the diethyl sulfate is brought up to polymerizing temperatures (560 to 580°) directly, and held there until the required consistency is obtained. The dehydration takes place as an incident to the heating up to this temperature. It will be appreciated that this higher temperature range is not necessary for dehydration, but only if polymerization is desired, as is generally the case in preparing drying oils.

The product of the dehydration, or dehydration plus polymerization, is a clear, light oil, substantially free of acidity and having a low acetyl value. It is unnecessary to take any steps to remove the diethyl sulfate. If there is any left in the oil after the treatment is completed, it is present in strictly innocuous proportions.

It is a curious fact that the boiling point of diethyl sulfate (about 406° F.) is lower than the temperatures employed in dehydrating. Apparently either the very small quantity of diethyl sulfate employed is retained at the high temperatures by the predominating mass of the oil, or it may be that the diethyl sulfate produces some change, during the time that the oil remains at lower temperatures, which renders its presence unnecessary in the latter high temperature stages.

The following examples are illustrative of certain good specific embodiments of the process of the present invention. In all the examples the starting material was a raw C. P. castor oil, of acetyl value 125, iodine value 85 and acid value 2 to 3.

*Examples*

1. A quantity of the above raw castor oil, with 0.25 per cent diethyl sulfate dissolved therein, was heated under vacuum, with a slow circulation of $CO_2$ through the oil. Upon reaching a temperature of 565° F. the process was discontinued. The oil showed complete miscibility with mineral oils. It tested as follows: acetyl value 74.5, acid value 4.7, iodine value 105.6. It is useful as a lubricant or in compounding lubricants. (The feed of $CO_2$ can be omitted without affecting the results achieved by the catalyst.)

2. A process was carried out as in Example 1, except that heating was continued at the same temperature for 3 hours, until a viscosity of Z-2 on the Gardner scale was attained. The oil thus obtained tested as follows: acetyl value 9.7, acid value 3.4 and iodine value 112.5. The oil applied to test panels dried very satisfactorily overnight, to a clear, firm, waterproof film, and was a first-rate drying oil in all respects.

3. A process was carried out as in Example 2, except that 0.5 per cent of diethyl sulfate was employed, and the heating time, after attainment of temperature of 560°, was 2¾ hours, (sufficient to attain a viscosity of Z-2). The product analyzed as follows: acetyl value 3.7, acid value 4.6, iodine value 115.0.

As evinced by the remarkably low acetyl value, and high iodine value, the produce was an oil of marked drying properties. This example shows how acetyl value is lowered, and polymerization time shortened, with increasing amounts of diethyl sulfate. Ordinarily, for economical reasons, only about 0.25 per cent of the diethyl sulfate is employed, as in Examples 1 and 2.

By arresting the heating immediately on arriving at the reaction temperature, in this Example 3, the product is not a polymerized drying oil, but it is freely miscible with mineral oils.

It is interesting to note that the use of diethyl sulfate in the large quantity specified in this example, 0.5 per cent, is without effect on the color of the oil. As a matter of fact, this is true with all proportions of diethyl sulfate. My catalyst is probably unique in this respect. By contrast, using sulfuric acid as a catalyst in a proportion as high as 0.3 per cent would turn the oil black.

4. Diethyl sulfate was incorporated in a quantity of the above raw castor oil, in the proportion of 0.125 per cent and the oil was brought up to 565° F. under vacuum while a slow stream of $CO_2$ was circulated through the oil. About one-half hour after this temperature was reached, treatment was stopped. The oil now showed free miscibility with mineral oils, and tested as follows: acetyl value 79.5, acid value 6.2, iodine value 101.6.

5. A process was carried out as in Example 4, except that the heating was continued at the same temperature for 5 hours, until the viscosity reached Z-2 on the Gardner scale. The oil produced tested acetyl value 20.8, acid value 4.9, and iodine value 105.5. A sample of the oil on a test panel "dried" overnight, but the film was somewhat tacky. The product is useful where a semi-drying castor oil is required.

For most purposes, a proportion of diethyl sulfate of about 0.2 to 0.5 per cent is best, the upper limit being determined partly by economic considerations. More than 1 per cent is rarely employed. Proportions substantially below 0.2 per cent, even as low as 0.05 per cent, are useful especially where miscibility with mineral oils, without production of a drying oil, is required.

Dimethyl sulfate (likewise a liquid) can be used in lieu of diethyl sulfate but special precautions should be taken in view of the poisonous character of the dimethyl sulfate. Other neutral alkyl sulfates, such as butyl, propyl, etc., sulfates can also be employed.

By the terms "dehydration" and "dehydrating" as used in the specification and claims is meant the removal from the castor oil of water formed during the heating, as a result of chemical change in the oil. Presumably, as pointed out above, this chemical change involves the separation of one or more hydroxyl groups together with one or more hydrogen atoms from the ricinoleic molecule.

What I claim is:

1. A method of dehydrating castor oil which comprises dissolving in the oil a small proportion of a neutral alkyl sulfate as catalyst and heating the mixture at such temperature and for such time as to effect a substantial degree of dehydration of the oil.

2. The method of claim 1, wherein the neutral alkyl sulfate is diethyl sulfate.

3. The method of claim 1, wherein the neutral alkyl sulfate added is in the proportions 0.05 to 1 per cent of the oil.

4. The method of claim 1, wherein the heating is arrested at a stage such that the oil shows miscibility with hydrocarbon solvents but no substantial drying properties.

5. The method of claim 1, wherein the heating is carried to the stage where the oil exhibits substantial drying properties.

6. The method of claim 1, wherein the heating is carried out under sub-atmospheric pressure.

7. A method of modifying castor oil which comprises dissolving in the oil a small proportion of a neutral alkyl sulfate, and heating the mixture up to an elevated temperature above approximately 500° F.

8. The method of catalytically modifying castor oil for effecting dehydration thereof which comprises heating a mixture of castor oil and a small proportion of a neutral alkyl sulfate to an elevated temperature within the range where water is formed as a result of chemical change in the castor oil molecule.

9. The method of catalytically modifying castor oil which comprises heating a mixture of castor oil and a small proportion of a neutral alkyl sulfate to an elevated temperature within the range where dehydroxylation occurs.

10. The method of catalytically modifying castor oil which comprises holding a mixture of castor oil and a small proportion of a neutral alkyl sulfate at an elevated temperature within the range where dehydroxylation occurs, until the oil exhibits substantial drying properties.

ALEXANDER SCHWARCMAN.

CERTIFICATE OF CORRECTION.

Patent No. 2,330,181.　　　　　　　　　　　　　　September 21, 1943.

ALEXANDER SCHWARCMAN.

It is hereby certified that error appears in the printed specification of the above numbered patent requiring correction as follows: Page 1, second column, line 49, for "akyl" read --alkyl--; page 2, second column, line 1, for "latter" read --later--; line 38, for "produce" read --product--; and that the said Letters Patent should be read with this correction therein that the same may conform to the record of the case in the Patent Office.

Signed and sealed this 9th day of November, A. D. 1943.

(Seal)

Henry Van Arsdale,
　　　　　　　　　　　　　　　　　　Acting Commissioner of Patents.